United States Patent
Thill et al.

(10) Patent No.: US 8,412,920 B2
(45) Date of Patent: Apr. 2, 2013

(54) METHOD FOR BOOTING PORTABLE OBJECTS WITH MULTIPLE COMMUNICATION INTERFACES

(75) Inventors: Michel Thill, Les Clayse sous Bois (FR); Laurent Castillo, Saint Germain en Laye (FR)

(73) Assignee: Gemalto SA, Meudon Cedex (FR)

( * ) Notice: Subject to any disclaimer, the term of this patent is extended or adjusted under 35 U.S.C. 154(b) by 271 days.

(21) Appl. No.: 12/671,635

(22) PCT Filed: Jul. 30, 2008

(86) PCT No.: PCT/EP2008/060016
§ 371 (c)(1),
(2), (4) Date: May 5, 2011

(87) PCT Pub. No.: WO2009/019184
PCT Pub. Date: Feb. 12, 2009

(65) Prior Publication Data
US 2011/0225404 A1    Sep. 15, 2011

(30) Foreign Application Priority Data
Aug. 3, 2007 (EP) .................................. 07290977

(51) Int. Cl.
G06F 15/177 (2006.01)
G06F 13/00 (2006.01)

(52) U.S. Cl. .............. 713/2; 713/1; 711/100; 711/104

(58) Field of Classification Search .................. 713/1, 2; 711/100, 104
See application file for complete search history.

(56) References Cited

U.S. PATENT DOCUMENTS

| 8,046,502 B2 * | 10/2011 | Kim et al. ................. 710/11 |
| 2005/0086434 A1 * | 4/2005 | Kang et al. ................. 711/115 |
| 2007/0055823 A1 * | 3/2007 | Jo et al. .................... 711/115 |
| 2007/0061501 A1 * | 3/2007 | Lasser ....................... 711/103 |
| 2008/0006704 A1 * | 1/2008 | Kim .......................... 235/492 |
| 2008/0245878 A1 * | 10/2008 | Shiota et al. ............. 235/492 |
| 2009/0037760 A1 * | 2/2009 | Scheibe et al. ........... 713/501 |
| 2009/0043918 A1 * | 2/2009 | Schroeder ................. 710/11 |
| 2010/0108772 A1 * | 5/2010 | Hartel ....................... 235/492 |

FOREIGN PATENT DOCUMENTS

| EP | 1 693 787 A1 | 8/2006 |
| WO | 02/31761 A1 | 4/2002 |
| WO | 2008/046349 A1 | 4/2008 |

OTHER PUBLICATIONS

International Search Report from PCT/EP2008/060016 dated Oct. 22, 2008 (4 pages).
Written Opinion from PCT/EP2008/060016 dated Oct. 22, 2008 (7 pages).
Rankl, W. et al.; "Handbuch der Chipkarten"; Hanser Verlag; Aug. 29, 2002; pp. 53-63 (11 pages).
English Patent Abstract of CN1936934 (A) from esp@cenet, published Mar. 28, 2007, 1 page.

* cited by examiner

*Primary Examiner* — Vincent Tran
(74) *Attorney, Agent, or Firm* — Osha • Liang LLP

(57) ABSTRACT

A boot sequence method comprises a determination step 110 and 200, a first starting step 120, 210 or 240 for starting a first interface, a first negotiation step 140 or 220 wherein a power negotiation is performed, a second negotiation step 140 or 230 for determining the interfaces to activate simultaneously, and a second starting step 150 or 230 wherein the interfaces that can be activated simultaneously are started one after each other.

14 Claims, 5 Drawing Sheets

METHOD FOR BOOTING PORTABLE OBJECTS WITH MULTIPLE COMMUNICATION INTERFACES

FIELD OF THE INVENTION

The invention relates to a method for booting portable objects with multiple communication interfaces.

The invention concerns portable objects, especially smartcards, that have multiple communication interfaces. This kind of objects can be started by any of these interfaces. The way to detect and activate the correct protocols on the portable object in such a case may be complex. In particular, the invention applies to smartcards with ISO, USB, MMC and SWP capabilities. Traditional smartcards only have one communication interface, which is naturally the one used for booting the card. New smartcards have multiple communication interfaces available. This kind of new smart card may be started by any one of these interfaces in a boot sequence specific to each interface. State-of-the-art chips have basic hardware detection mechanisms: they can test the chip pins state to see if an interface is active.

BACKGROUND

For now, these "new" smartcards are used only in dual mode, i.e. only two of the communication interfaces are used and are always active. One fundamental assumption is that such objects won't be put in an unknown environment: for instance a card that is used in ISO/MMC mode is not supposed to be put in a USB reader.

Some constraints are set between the interfaces to correctly boot the card. In that configuration, the boot sequence simply has to rely on the detection mechanism of one of these interfaces to correctly determine the running interface(s).

A problem is that interface detection is not 100% reliable. Some interface may be not detected and some other can be detected even if they are not present. This is due to the several possibility of implementation of interfaces into the reader, which are not standardized.

The power supply pin is shared between all interfaces and the card has no way to know which interface is the source of power. A goal is to have a portable object that can activate all the supported interfaces (here, ISO/MMC/USB/SWP). Some interfaces may be multiplexed on the same pins and may not be activated simultaneously.

SUMMARY

A first aspect of the invention is to find a way to implement a boot sequence that can activate more than two interfaces in the smartcard. The sequence must not crash in "hostile" environments: when several interfaces are multiplexed, the sequence must not start an interface that has a destructive effect on the host or the card. Preferentially, the sequence has to handle conflicting voltage negotiation and must come with minimal and clear constraints on host interface(s) implementation.

According to a second aspect of the invention, the invention is a boot sequence method for a portable object having a plurality of pins intended to be connected to a corresponding plurality of pins of a reader. Said portable object has at least two communication interfaces connected to said pins. The reader having one or more communication interface connected to said pins, wherein the communication interfaces of the reader is comprised in a list of interfaces larger than the interfaces supported by the card. Said method comprises a determination step, a first starting step, a first negotiation step, a second negotiation step and a second starting step. In the determination step, one selected interface of the card is determined for initiating a communication with the reader. In the first starting step, the selected interface is started for communicating with the reader. In the first negotiation step, a power negotiation is performed between the card and the reader for determining a compatible power range. In the second negotiation step, a negotiation is performed between the card and the reader for determining the interfaces to activate simultaneously. In the second starting step, the interfaces that can be activated simultaneously are started one after each other.

Depending of several embodiment possibilities, the determination step may comprise an identification step for identifying, if it exists, at least one non-conflicting interface common for the card and the reader. The determination step may comprise a detection step for determining if one or more interface of the card is present in the reader. The detection step may detect at least two interfaces of the card present in the reader, and the starting step may start a preferred interface between the detected interfaces. The detection step may detect at least two interfaces of the card present in the reader, and the starting step may start a most constrained interface between the detected interfaces. If the detection step detects at least two interfaces of the card present in the reader, the detection step may further comprise a choice step that determines the more sure interface present both in the reader and in the card. The list of interface may comprise at least two interfaces chosen among: ISO 7816, USB, MMC, and SWP.

According to another aspect of the invention, the invention is a portable object having processing means and at least two communication interfaces. Said portable object comprises means for implementing the different step of the boot sequence method. Preferentially, said object is a smart card.

DETAILED DESCRIPTION

Figure 1:
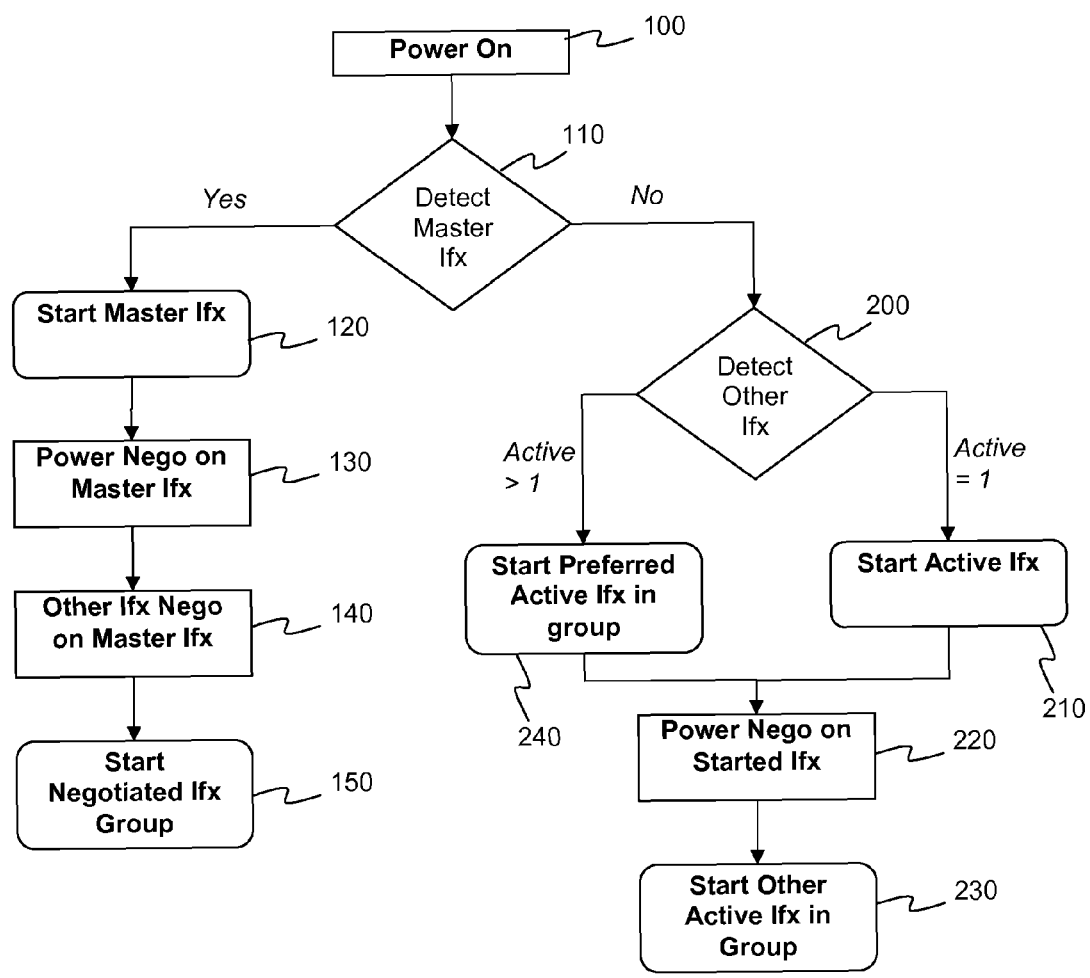
FIG. 1 shows a first general embodiment of a multi interface startup sequence.
Figure 2:
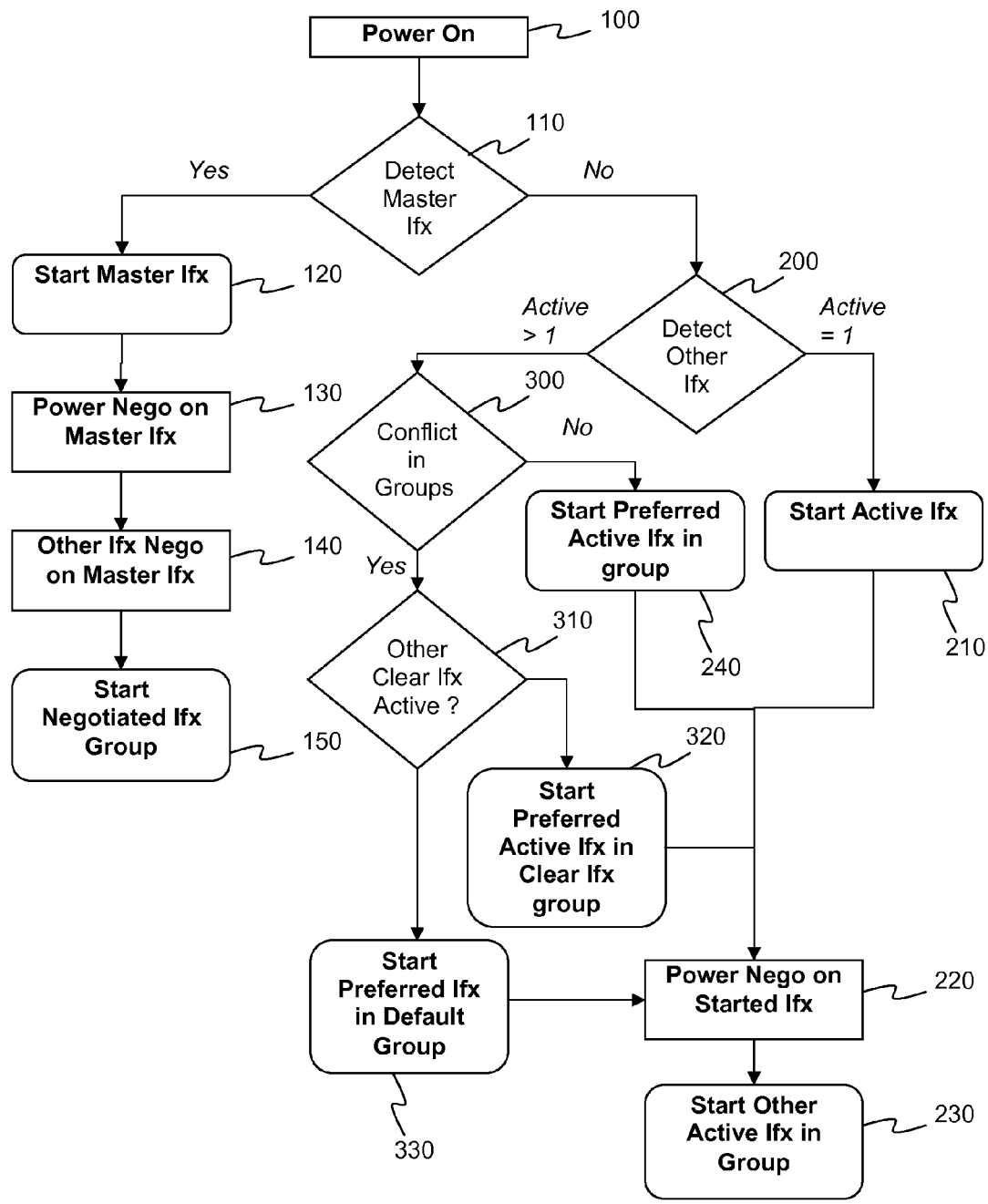
FIG. 2 shows a multi Interface startup sequence with detection conflict resolution.
Figure 3:
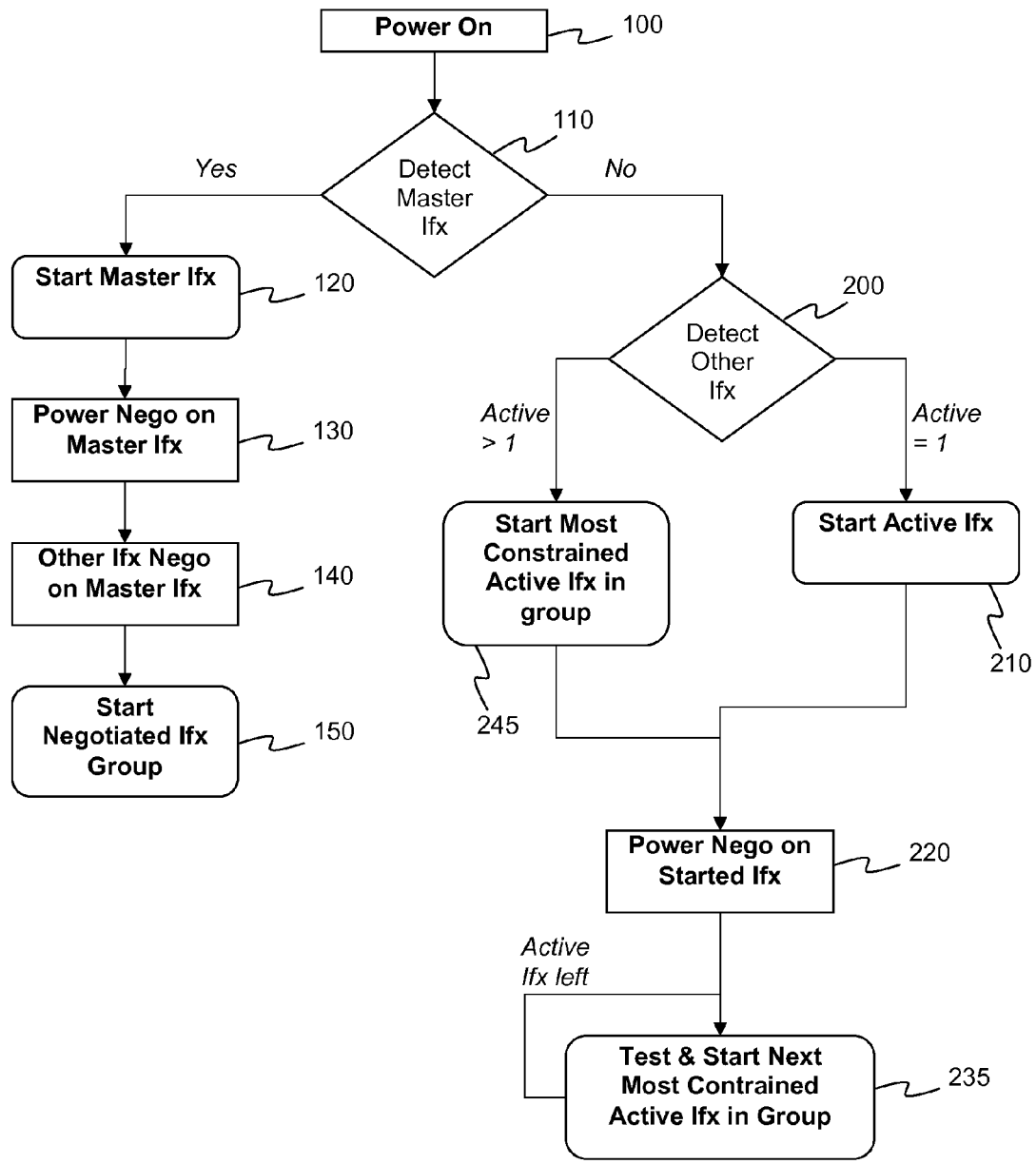
FIG. 3 shows a multi Interface startup sequence with interface ordering by power & timing constraints.

The invention presents a startup sequence of the portable objects that can unambiguously and non-destructively activate the correct interfaces, and that leads to a minimal set of constraints on the host. The FIGS. 1 to 3 illustrate flow charts of several embodiments of startup sequence for a smart card supporting several communication interfaces. In these three figures same references corresponds to same steps and are described in relation with only one figure for summarizing the comprehension.

The startup sequence is constructed with the following steps:

A Power On step 100 is the beginning of the chart and corresponds to the plug in of a card or to the power switch on of the card by its reader.

Then an identification of the present interfaces is performed for identifying a group of non-conflicting interfaces. Conflicting interfaces happen:

Because of different voltage negotiations
Because of different voltage ranges
Because of multiplexed pins.

The test 110 corresponds to the identification of at least one common non-conflicting interface (Master Ifx) to negotiate voltage and other active group of interfaces. If a Master Ifx is detected, then the Master Ifx is started in step 120. In step 130, a power negotiation is performed through the Master Ifx. Said power negotiation may consist in the determination of the more appropriate voltage for the card and of the more appropriated current limitation by the reader. Several methods are known. Then a negotiation can be start between the reader and the card in step 140 for determining which are the interfaces supported by the card and by the reader. The negotiation step 140 enables the determination of all the interfaces (Negotiated Ifx) that can be started simultaneously. Then in a step 150, the Negotiated Ifx are started together.

If no Master Ifx is detected then the card continues the detection for determining which of its interfaces can be used. The test 200 illustrates the number of active interface (Active Ifx) that are detected. By Active Ifx, the man of the art should understand all the interfaces detected by the card into the reader and corresponding to at least one interface of the card. If only one Active Ifx is detected, this Active Ifx is started in step 210. Then, in step 220, a power negotiation is performed like in step 130. After this power negotiation step 220, activation Step 230 is performed for activating, if any other interfaces in the card and in the reader can be activated, like in step 140 and 150.

If more than one Active Ifx is detected, then the card starts a preferred Active Ifx in step 240. A preference order number associated to each interface of the card can determine the preferred interface. If two of more interfaces are detected together, the preferred interface corresponds to the interface having the highest order number. Then steps 220 and 230 can be performed.

The FIG. 2 shows an alternative to the preferred order of the interfaces in case of the detection of more than one Active Ifx. A test 300 is used for illustrating the detection of a potential conflict in a group of at least two detected Active Ifx. If there is no conflict in the group, the Step 240 of FIG. 1 can be performed and followed by steps 220 and 230.

If a potential conflict exists in the group of detected Active Ifx, the test 310 is performed for determining if another group of interface can be considered for determining an eventual detection ambiguity. A Clear Ifx or a Clear Ifx group corresponds to one interface or a group of interfaces that can lift the ambiguity if two interfaces are detected but must not be present at same time. If a Clear Ifx group, of at least one interface, exists, then the step 320 is performed for starting a preferred interface in said group. Then Step 220 and 230 are performed and other Active Ifx may be started.

If no Clear Ifx can be found, then Step 330 is performed. Step 330, consists in the selection of Active Ifx corresponding to a default group of interfaces and wherein a preferred interface is chosen in said selection of the Active Ifx.

The FIG. 3 is directed to another variant of FIG. 1 wherein, in case of several Active Ifx detected by test 200, the choice of Active Ifx deals with optimum activation timings. Even in a compatible group of interfaces, each interface may have its own timing and power consumption constraints. This variant consists in ordering these interfaces from the most constraining one (fastest startup time required or smaller power consumption) to the least constraining. The activation sequence step 245 is then performed instead of step 240. So in step 245, the most constrained Active Ifx is started, then step 220 is performed. In this variant, step 235 is performed after step 220 for starting one by one, the other Active Ifx, from the most constrained Active Ifx to the least constraining Active Ifx. Only compatible Active Ifx are started.

These three figures can be summarized to a single boot sequence method for a portable object having a plurality of pins and intended to be connected to a corresponding plurality of pins of a reader. Said portable object have at least two communication interfaces connected to said pins, and the reader have one or more communication interface connected to said pins. The communication interfaces of the reader is comprised in a list of interfaces larger than the interfaces supported by the card but known by the card in such a way that the card is aware of potential conflict between possible interface. The card may have more interface than the reader and also may have pins that can be uses by several interface of said card, which is also a conflict source. The card necessarily comprises detection means for detecting what kind of interface has the reader. Said summarized method comprises:

A determination step regrouping step 110 and 200 and also steps 300 and 310. In this determination step, one selected interface of the card is determined for initiating a communication with the reader.

A first starting step regrouping steps 120, 210 and 240 but also step 245, 320 and 330, depending of the figure case. In this first starting step, the selected interface is started for communicating with the reader. The starting of this sole interface prevents most of the potential conflict and reduces the chance to have damage in case of a detection error. As it has been indicated in relation with the FIGS. 1 to 3, several implementations are possible and can be chosen as a function of potential risk linked to the interface of the card.

A first negotiation step regrouping steps 130 and 220. In this first negotiation step, a power negotiation is performed between the card and the reader for determining a compatible power range. This power range defines a minimum and maximum voltage and a current limitation. The determination depends of the power supply capability for the reader and of card specification. After this step, the power is set to a value into the determined range.

A second negotiation step regrouping steps 140 and 230. In this second negotiation step, a negotiation is performed between the card and the reader for determining the interfaces to activate simultaneously. This negotiation is made with message exchanges between the card and the reader. The interfaces that are taken into account are all the interfaces really present in the card and in the reader. This determination takes also into account the power range and all compatibility problems that may exist. A list of all interface that card be used simultaneously can be establish without any error.

A second starting step regrouping steps 150 and 230. In this second starting step, the interfaces that have been determined during the second negotiation step are started one after each other.

Now, practical implementations of the invention that concern Smartcards equipped with ISO, MMC, USB and SWP protocols, will be more detailed. An example of pin connections of such interface is shown for example in European patent application 06291243.1 filed on Jul. 31, 2006.

Figure 4:
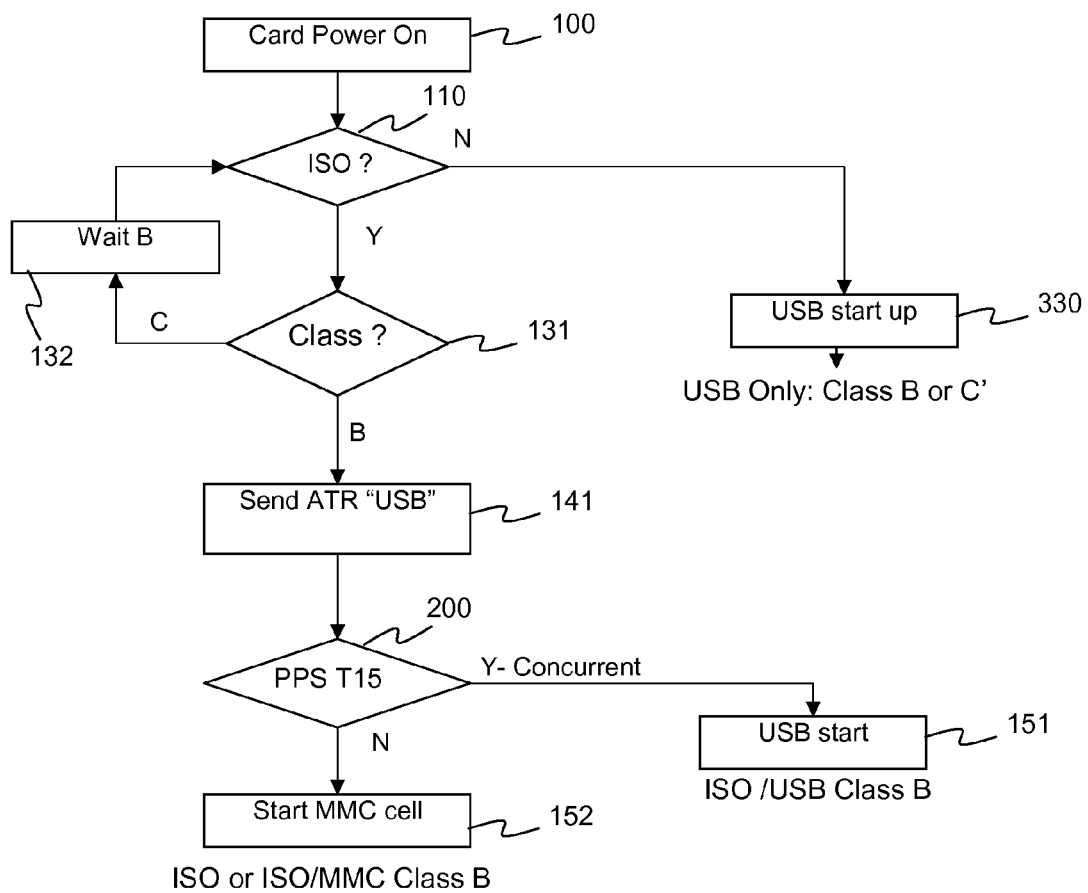
FIGS. 4 and 5 illustrate more detailed implementation related to Smartcards.

The FIG. 4 corresponds to a first example in which we consider a card using only ISO, MMC and USB. MMC and USB are short-circuited on the card, and are therefore in different compatibility groups. ISO, MMC and USB can all work in 1.8 and 3V. As a reminder, ISO class B corresponds to the power supply of 3V and the ISO class C corresponds to the power supply of 1.8 V. The compatibility groups are then:

ISO-USB/3V, ISO-USB/1.8V, ISO-MMC/3V and ISO-MMC/1.8V. ISO is the common interface in all these groups.

The FIG. 4 directly implements the flow chart of FIG. 2. In that case, the USB/MMC detection is considered unreliable. This means that whatever the interface in the reader, the card is unable to detect which of said interface is really in the reader.

The identification of the common interface of step 110 consists in ISO protocol interface detection. If no ISO interface is detected then we consider that we detect both USB and MMC interface. Tests 200, 300 and 310 has an implicit result that there is two interface detected with no interface that can clearly be identified. So step 330 is performed and the default activated interface chosen is the USB interface. Power negotiation can be made for determining power class B or C.

If ISO is detected, ISO is the Master Ifx. Power negotiation 130 is made for positioning the power in class B only. The card may refuse voltage class C because of the presence of a NAND flash in the card, for example. So a test 131 verify if the class is B, if not a step 132 request class B and wait the power change before starting the second negotiation with the reader.

Step 140 is divided in two steps 141 and 142 that correspond to an exchange of message. Step 141 is the sending by the card of an ATR message defining in ISO 7816 standard that corresponds to a first message of the card identifying several features of the card. In this ATR, the card indicates to the reader the USB compatibility. If the reader supports USB, then the reader send a message PPS T15, also defined by ISO 7816 standard. If the card receives PPS T15 message then USB is started in step 151. If the PPS T15 message is not received, MMC interface of the card is started in step 152.

Figure 5:
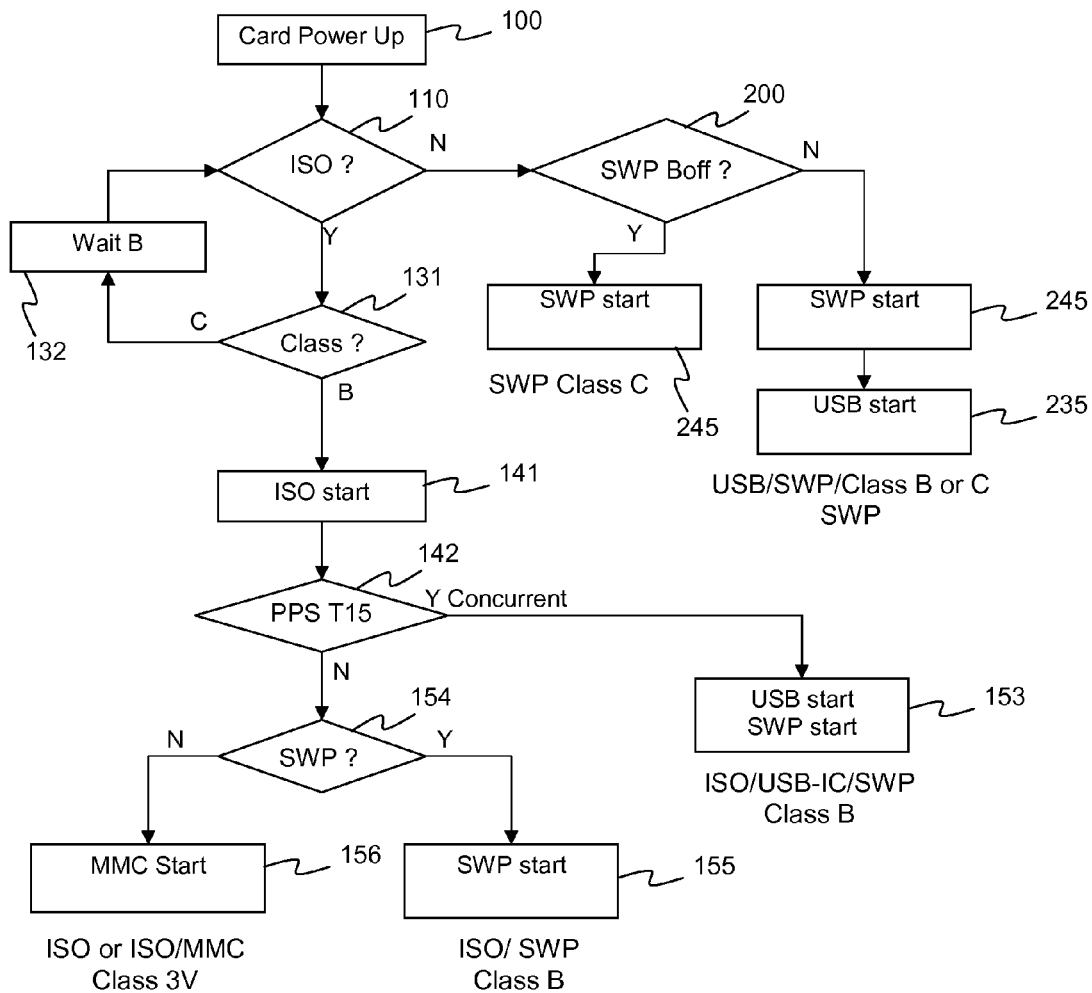

The FIG. 5 corresponds to a second example, in which a card is fully compatible with ISO/MMC/USB/SWP. In that scenario, USB and SWP are wired on the same pins as the MMC. All these interfaces can work at 3V or 1.8 V, hence the compatibility groups are: ISO/USB/SWP/Class B, ISO/USB/SWP/Class C, ISO/MMC/Class B, ISO/MMC/Class C.

Again, USB/MMC detection mechanism is considered unreliable. In addition, the SWP protocol has a specific battery off mode with heavy constraints in terms of consumption and timings. In the group ISO/USB/SWP, the constraint-ordered group is: SWP-ISO-USB. So the FIGS. 2 and 3 are combined and adapted for having FIG. 5. Finally, the PPS T15 only eliminates the USB, but an ambiguity is left on ISO/SWP vs ISO/MMC. Once again the common master interface and we still refuse 3V for ISO driven applications because of the presence of a NAND flash.

For summarizing, if ISO interface is not detected, SWP interface is detected together with its power constraint related to its battery in step 200. If the state is "Battery Off", the power is not sufficient for other interface than SWP so SWP only is started in step 245. If SWP is not in "Battery Off" state, that means that there is enough power for starting another interface. Considering that SWP is present, then the other interface is necessary the USB interface. SWP interface is started in step 245 then USB is started in step 235.

If ISO interface is present in reader, the negotiation is performed as previously indicated. But if the card receives message PPS T15, test 142, that indicates the presence of an USB interface and may be an SWP interface but with no risk to have an MMC interface, so USB interface is started at step 153, and SWP interface is also started at step 153.

If the reader does not answer positively in test 142, the card checks if SWP is present at test 153. If SWP interface is present, then SWP interface is started at step 155, else MMC interface is started at step 156.

The invention claimed is:

1. A boot sequence method for a portable object having a plurality of pins of the portable object intended to be connected to a corresponding plurality of pins of a reader, the portable object having at least two communication interfaces connected to the plurality of pins of the portable object, and the reader having at least one communication interface connected to the plurality of pins of the reader, wherein the at least one communication interface of the reader is comprised in a list of communication interfaces comprising more communication interfaces than supported by the portable object, the method comprising:

a determination step wherein a selected communication interface of the at least two communication interfaces of the portable object is determined for initiating a communication with the reader, a first starting step wherein the selected communication interface is started for communicating with the reader, a first negotiation step wherein a power negotiation is performed between the portable object and the reader for determining a compatible power range, a second negotiation step wherein a negotiation is performed between the portable object and the reader for determining a first communication interface of the at least one communication interface of the reader and a second communication interface of the at least two communication interfaces of the portable object to activate simultaneously, and a second starting step wherein the first communication interface and the second communication interface are started one after each other.

2. The method of claim 1, wherein the determination step comprises an identification step for identifying at least one non-conflicting interface common for the portable object and the reader.

3. The method of claim 1, wherein the determination step comprises a detection step for determining whether at least one communication interface of the at least two communication interfaces of the portable object is present in the reader.

4. The method of claim 3, wherein, if the detection step detects at least two communication interfaces of the portable object are present in the reader, the first starting step starts a preferred communication interface between the detected communication interfaces.

5. The method of claim 3, wherein, if the detection step detects at least two communication interfaces of the portable object are present in the reader, the first starting step starts a most constrained communication interface between the detected communication interfaces.

6. The method of claim 3, wherein, if the detection step detects at least two communication interfaces of the portable object are present in the reader, the detection step further comprises a choice step that determines the more sure communication interface present both in the reader and in the portable object.

7. The method of claim 1, wherein the list of communication interface comprises at least two communication interfaces selected from a group consisting of: ISO 7816, USB, MMC, and SWP.

8. A portable object comprising:
a processor; and
at least two communication interfaces,
wherein the portable object, using the processor, is configured to:
determine a selected communication interface of the at least two communication interfaces for initiating a communication with a reader;

start the selected communication interface for communicating with the reader;

perform a power negotiation with the reader for determining a compatible power range;

perform a communication interface negotiation with the reader for determining a reader communication interface for the reader and a portable object communication interface for the portable object to activate simultaneously; and start portable object communication interface;

wherein the reader communication interface and the portable object interface are started one after each other.

9. The portable object of claim 8, wherein the portable object is a smart card.

10. The portable object of claim 8, wherein determining the selected communication interface comprises identifying at least one non-conflicting interface common for the portable object and the reader.

11. The portable object of claim 8, wherein determining the selected communication interface comprises detecting whether at least one communication interface of the at least two communication interfaces of the portable object is present in the reader.

12. The portable object of claim 11, wherein, if at least two communication interfaces of the portable object are present in the reader, starting the selected communication interface comprises starting a preferred communication interface between the detected communication interfaces.

13. The portable object of claim 11, wherein, wherein, if at least two communication interfaces of the portable object are present in the reader, starting the selected communication interface comprises starting a most constrained communication interface between the detected communication interfaces.

14. The portable object of claim 11, wherein, wherein, if at least two communication interfaces of the portable object are present in the reader, detecting whether at least one communication interface of the at least two communication interfaces of the portable object is present comprises determining the more sure communication interface present both in the reader and in the portable object.

* * * * *